No. 856,219.  
PATENTED JUNE 11, 1907.  
J. O. BROADFOOT.  
NUT LOCK.  
APPLICATION FILED SEPT. 13, 1906.
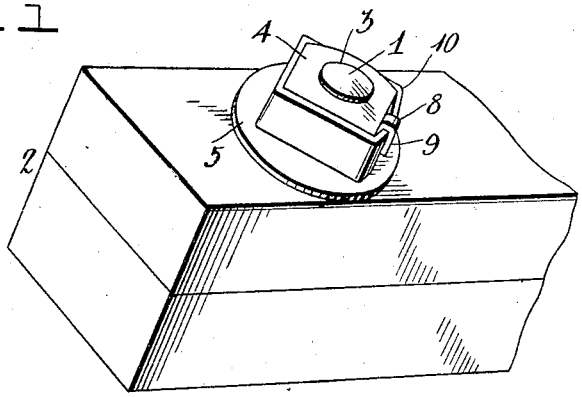
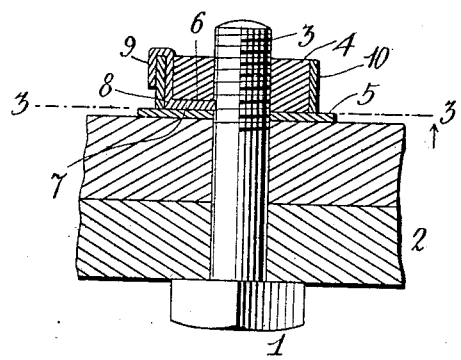
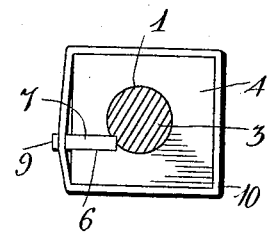
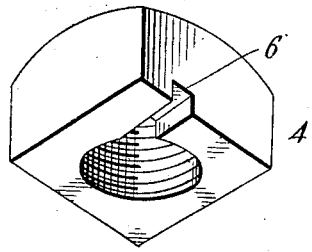
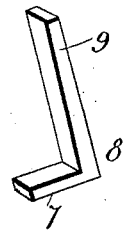
Witnesses  
Inventor  
J. O. Broadfoot  
by *H. B. Willson & Co*  
Attorneys

UNITED STATES PATENT OFFICE.

JACOB O. BROADFOOT, OF GORDON, TEXAS.

NUT-LOCK.

No. 856,219.         Specification of Letters Patent.         Patented June 11, 1907.

Application filed September 13, 1906. Serial No. 334,496.

*To all whom it may concern:*

Be it known that I, JACOB OSCAR BROADFOOT, a citizen of the United States, residing at Gordon, in the county of Palo Pinto and State of Texas, have invented certain new and useful Improvements in Nut-Locks; and I do declare the following to be a full, clear, and exact description of the invention, such as will enable others skilled in the art to which it appertains to make and use the same.

This invention relates to improvements in nut locks of that class in which the nuts are locked upon their bolts.

The object of the invention is to provide a device of this character, which will be simple and practical, easy to apply and remove and very effective for the purpose intended.

With the above and other objects in view, the invention consists in certain novel features of construction, combination and arrangement of parts hereinafter described and claimed.

In the accompanying drawings,—Figure 1 is a perspective view, showing a nut locked upon its bolt in accordance with the invention; Fig. 2 is a longitudinal sectional view through the same; Fig. 3 is a transverse sectional view, taken on the plane indicated by the line 3—3 in Fig. 2; Fig. 4 is a perspective view of the inner face of the nut; and Fig. 5 is a perspective view of the locking pin or key.

Referring to the drawings by numeral, 1 denotes a bolt of the usual form passing through an object or objects 2 of any description, and having upon its threaded end 3 a nut 4. A washer 5 of the usual form is preferably placed upon the bolt between the object 2 and the nut 4, which latter may be of any suitable form and construction.

In the practice of the invention, the nut 4 is formed in its under or inner face with a radially or tangentially-extending groove 6. This groove extends from one side face of the nut to the threaded central opening therein and is adapted to receive the bent end 7 of a locking pin or key 8, preferably constructed of flexible metal. The long arm or end 9 of this locking key projects angularly from the short end 7 and is preferably slightly tapered from its inner to its outer portion. The angle at which the two ends 7, 9, are disposed with respect to each other, is preferably slightly less than a right angle, and the short end 7 is of slightly greater length than the groove 6, so that when a locking band 10 is driven down over the top of the nut and upon the outer face of the end 9 of the locking key, the end 7 will be forced by said band inwardly and will be caused to engage or bite the thread 3 in the bolt 1. The nut will be thus effectively locked against rotation upon the bolt, as will be seen with reference to Figs. 2 and 3 of the drawings.

The retaining band 10 is endless and of a form corresponding to that of the nut over which it is adapted to snugly fit. In driving this band down upon the nut, it will be seen that it will force the end 8 of the locking key tightly against the nut and thereby drive the end 7 inwardly. The end 8 of the locking key is of sufficient length to project above the outer face of the nut, so that it may be bent downwardly over the band 10, as shown at 11, in order to effectively lock the band upon the nut.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent, is,—

1. In a nut lock, the combination with a bolt, of a nut screwed thereon and having a groove or channel extending from one of its faces to the central threaded opening therein, a locking key engaged with one face of the nut and having a portion to enter said groove and engage the threads of the bolt, and a band to fit over the nut and said key to retain the latter upon the nut and force it into engagement with the threads of the bolt, said key having its projecting end bent over upon said band to retain the latter upon said nut.

2. In a nut lock, the combination with a bolt, of a nut screwed thereon and having in its bottom face a tangentially-extending groove opening into the threaded aperture in the nut and upon one side face of the nut, an angular locking key having a short end seated in said groove and a long end engaged with said side face of the nut, and a band to fit over the nut and the long end of said key to retain the latter upon the nut and to force its short end into engagement with the threads of the bolt, the long end of said locking key being bent over said band to retain the latter upon the nut, substantially as shown and described.

In testimony whereof I have hereunto set my hand in presence of two witnesses.

JACOB O. BROADFOOT.

Witnesses:
W. A. CHAPMAN,
J. D. MONTGOMERY.